Sept. 21, 1965 H. J. KOEBER 3,208,078
AUTOMATIC SKY LIGHT BALANCING IN CAMERA EXPOSURE CONTROL
Filed Jan. 7, 1963 3 Sheets-Sheet 1
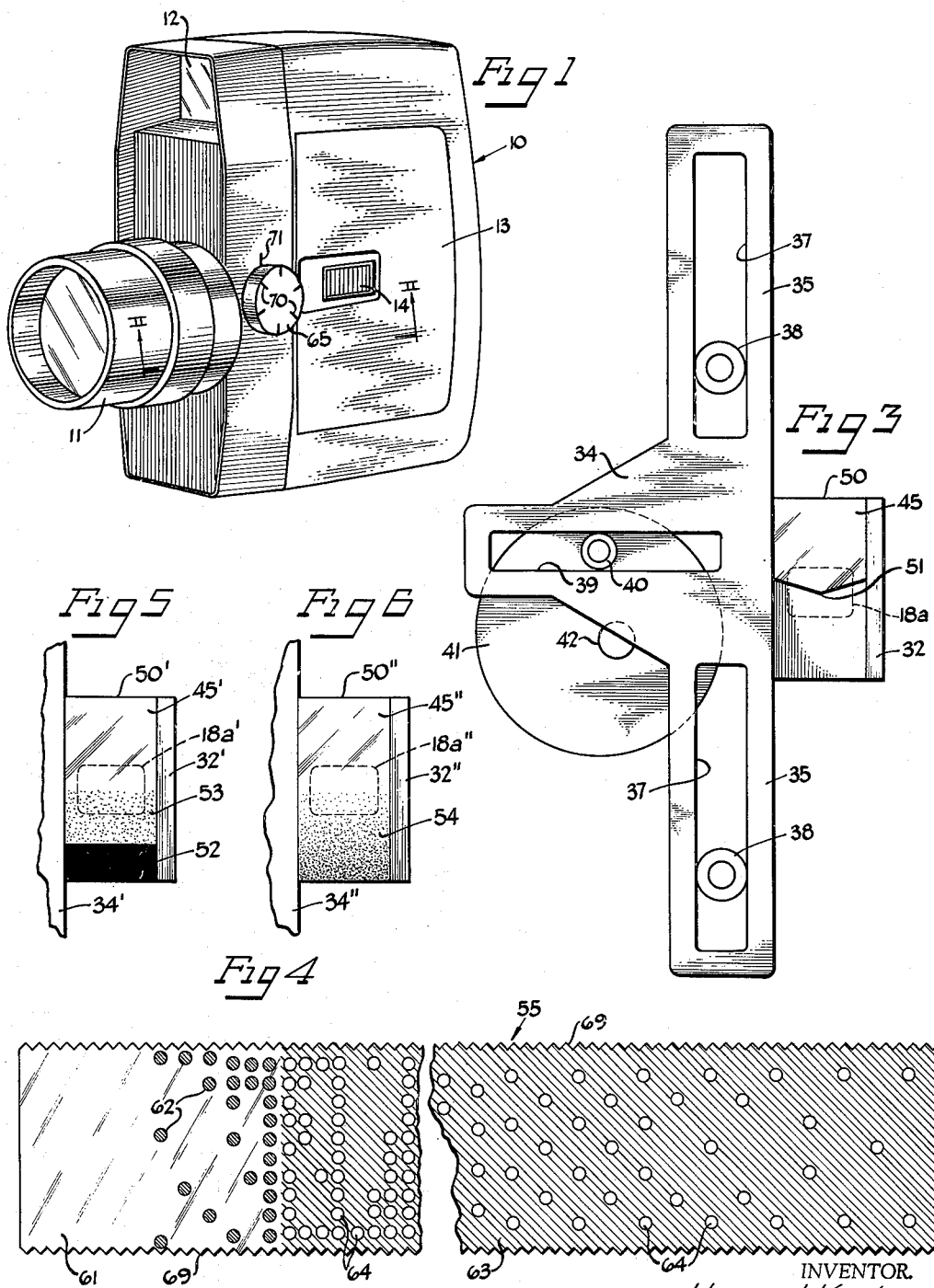
INVENTOR.
Henry J. Koeber
BY
Hill, Sherman, Meroni, Gross & Simpson
ATTORNEYS Sept. 21, 1965    H. J. KOEBER    3,208,078
AUTOMATIC SKY LIGHT BALANCING IN CAMERA EXPOSURE CONTROL
Filed Jan. 7, 1963    3 Sheets-Sheet 2
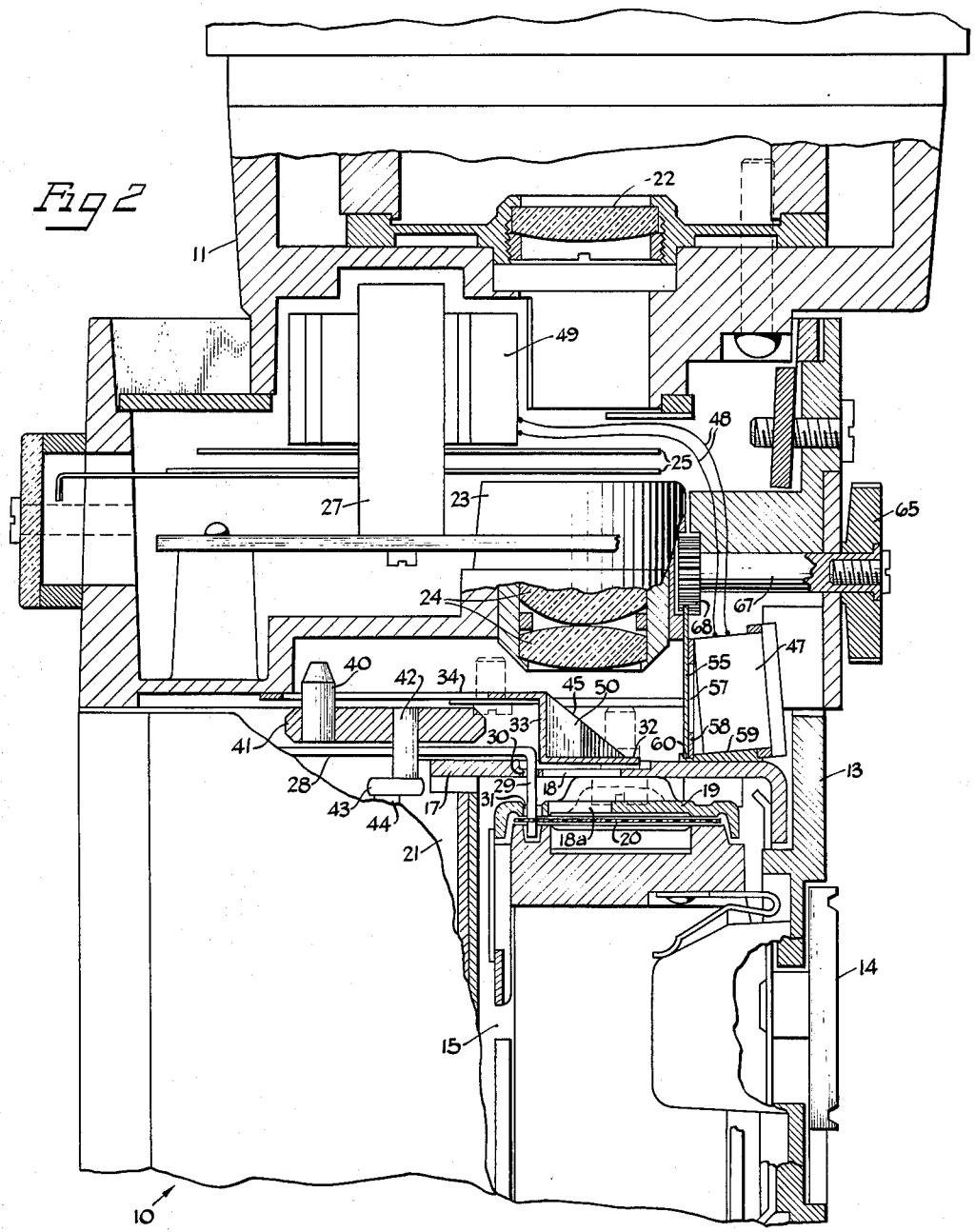
INVENTOR.
Henry J. Koeber
BY
Hill, Sherman, Meroni, Gross & Simpson
ATTORNEYS

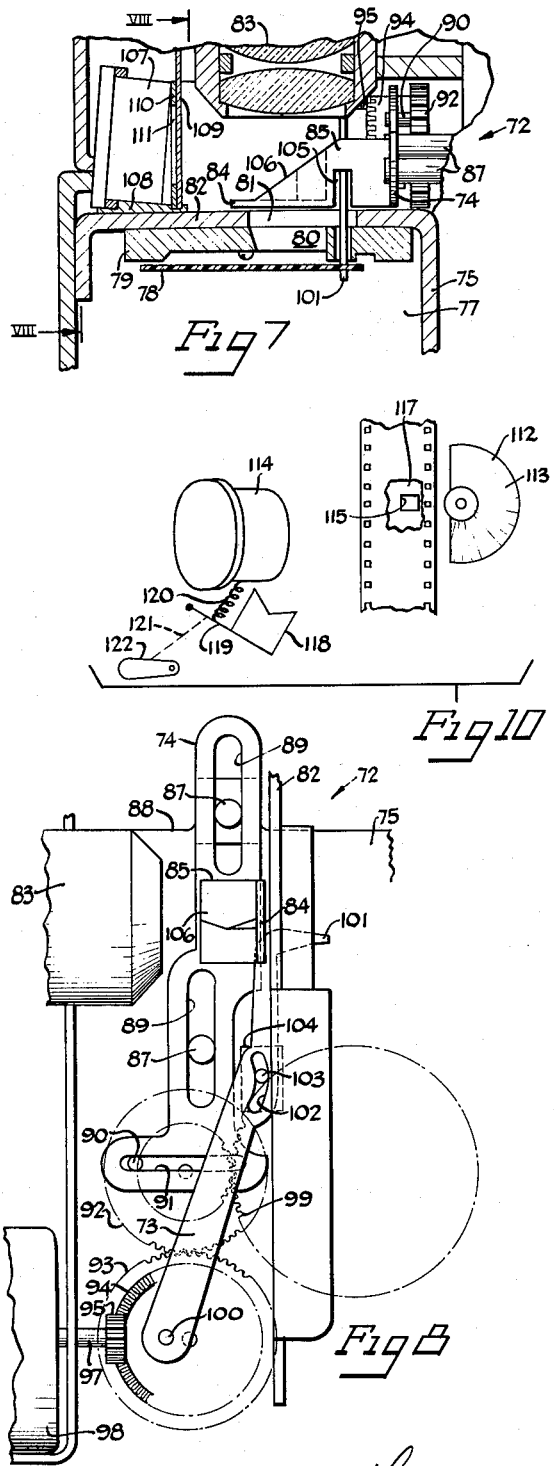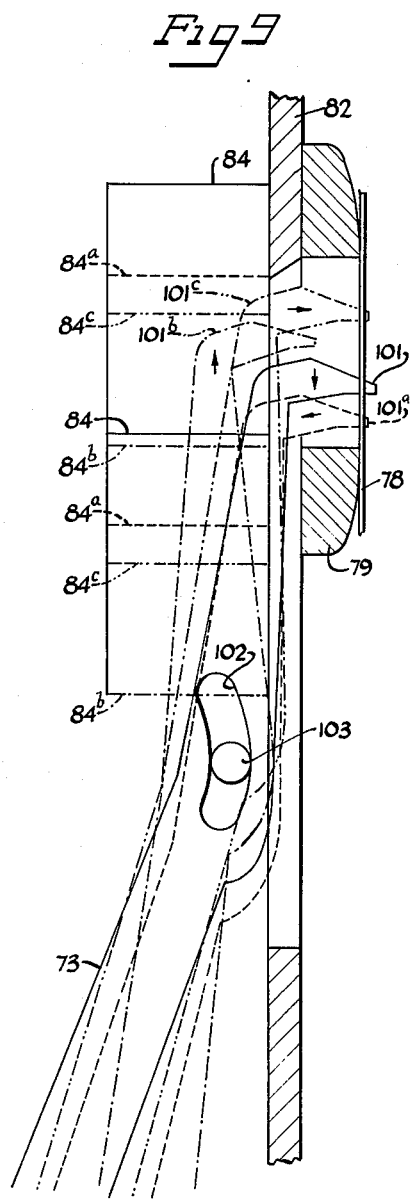

United States Patent Office 3,208,078
Patented Sept. 21, 1965

3,208,078
AUTOMATIC SKY LIGHT BALANCING IN CAMERA EXPOSURE CONTROL
Henry J. Koeber, Deerfield, Ill., assignor to Bell & Howell Company, Chicago, Ill., a corporation of Illinois
Filed Jan. 7, 1963, Ser. No. 249,775
13 Claims. (Cl. 352—141)

The present invention relates to improvements in photographic cameras and more particularly to the attainment of balanced light conditions in the light-sensitive automatic exposure controls of motion picture cameras.

Automatic exposure controls in moving picture cameras employing a light-sensitive photoconductive cell or electric eye located adjacent to but receiving scene light independently of the photographic lens system have the disadvantage of being often influenced by incident light and luminosity, and especially reflections, which may be outside of the lens range. This distorts the diaphragm setting of the camera by virtue of the false, or at least improperly coordinated, light or illumination reading thus made by the electric eye, relative to the light actually reflected from the object or scene comprising the image impinged by the lens system onto the photographic film. In order to overcome this margin of error, it has heretofore been proposed to activate the light-sensitive photoconductive cell by the light actually passing through the picture-taking lenses by means of a reflective surface on at least a portion of a rotary shutter located behind the lens and in front of the film aperture in the camera. Such a rotary shutter, however, together with its operating mechanism necessarily occupies substantial room across the interior of the camera and thus requires a fairly bulky housing.

In an endeavor to reduce camera size, it is desirable to employ a reciprocable shutter which can operate within at least half the side-to-side space required for a rotary shutter. While with a reciprocable shutter, excellent results can be attained in respect to shutter timing and balanced photographed image illumination within compact space, certain problems have been encountered in the attainment of proper automatic exposure control by an internally located light-sensitive photoconductive cell with through-lens illumination. Among these problems is that of attaining proper coordination of light passed through the lens to both the film and to the photoconductive cell in the shutter cycles. Another problem resides in tendency of overemphasis in sky light directed toward the photoconductive cell during photographing and thus a tendency toward underexposure error in respect to ground portions of the photographed image. Further, when the camera is stopped, the film aperture is covered by the shutter to prevent fogged or flash frames, but during this time the automatic exposure system should maintain the diaphragm exposure opening in readiness for resumption of photographing, and this creates a substantial problem in maintaining properly balanced light-sensitization of the photo cell and avoidance of any substantial difference of the diaphragm or iris opening between the stopped and running conditions of the camera, to avoid the penalty of incorrect exposure of the first few frames at the start of each run of the film and until the automatic exposure control system settles down to the correct setting.

An important object of the present invention, therefore, is to provide a new and improved automatic exposure control system for motion picture cameras, especially suitable for linearly reciprocable shutter arrangements but which, as to certain features may also be employed to improve the behind-lens automatic exposure control systems employing a rotary shutter with reflecting means thereon.

Another object of the invention is to provide new and improved means for controlling the ground-sky light ratio in the lens image light beam diverted to the photoconductive cell of an automatic exposure control system to maintain the diaphragm means controlled thereby in proper adjustment for optimum film exposure.

A further object of the invention is to attain a balanced reflection of light from the optical field of a camera for operation of an automatic exposure control system including a light-sensitive photoconductive cell while photographing.

Yet another object of the invention is to attain a balanced reflection of light from the optical field of a camera for operation of an automatic exposure control system including a light-sensitive photoconductive cell during closed shutter or non-photographing interval so as to maintain a correct exposure setting for resumption of photographing.

It is also an object of the invention to provide a new and improved behind-lens automatic exposure control system for motion picture cameras utilizing rectilinearly reciprocal shutters.

A still further object of the invention is to provide novel behind-lens light-sensitive automatic exposure control means for cameras.

Other objects, features and advantages of the present invention will be readily apparent from the following detailed description of certain preferred embodiments thereof, taken in conjunction with the accompanying drawings, in which:

FIGURE 1 is a perspective view of a motion picture camera embodying features of the invention;

FIGURE 2 is an enlarged fragmentary sectional elevational detail view taken substantially on the line II—II of FIGURE 1;

FIGURE 3 is a fragmentary more or less schematic elevational view of the shutter of the camera as viewed from the front of the camera;

FIGURE 4 is a fragmental plan view of a film speed adjustment mask as utilized in association with the light-sensitive phootoconductive cell of the camera;

FIGURE 5 is a fragmentary elevational view of the shutter similar to FIGURE 3 but showing a modification;

FIGURE 6 depicts a further modification of the shutter;

FIGURE 7 is a fragmentary horizontal sectional detail view disclosing a modified camera arrangement;

FIGURE 8 is a fragmentary vertical elevational detail view taken substantially on the line VIII—VIII of FIGURE 7;

FIGURE 9 is an enlarged fragmentary schematic detail view illustrating cyclical correlation of the shutter and shuttle of the embodiment of FIGURES 7 and 8; and FIGURE 10 is a schematic view showing still another modification.

In FIGURE 1 is shown a motion picture camera 10 having on its front end a lens carrier 11 and provided with suitable view finder means in this instance including a window 12 in the upper portion of the camera unit. At one side, herein the left side, a suitably hinged door 13 including suitable externally manipulable latch means 14 permits access into the camera for film loading into a film compartment 15, (FIG. 2) provided with a front wall 17 through which opens an exposure aperture 18 aligned with a film aperture 18a in a member 19 of a film gate assembly through which motion picture film 20 is operatively threaded. The arrangement shown is for alternately exposing each longitudinal half of the film. Inside the camera, as for example beside the film chamber 15 is provided a chamber 21 housing other mechanism of the camera including a prime mover such as a spring loaded or battery powered motor for film reel drive and shuttle and shutter operation. Suitable control knobs, buttons, control latch means and, if necessary, wind-up key means, are provided on the right side of the camera, as is customary, and which side is not shown in FIGURE 1.

In the illustrated camera assembly, a lens 22 in the rear portion of the lens carrier 11 is spaced forwardly from an objective carrier 23 supporting a set of lenses 24 on the optical axis in the optical path provided by the lenses and in spaced relation behind which the exposure aperture 18 is disposed in alignment. In the space between the inner end of the lens carrier 11 and the lens carrier 23 is operatively positioned a diaphragm or iris assembly 25 having relatively movably adjustable iris blades as shown mounted on a supporting bracket structure 27 and functioning to provide an exposure opening in a manner known in the art.

Frame-by-frame advance of the film 20 is effected by means of an oscillating shuttle 28 mounted adjacent to the front wall 17 of the film chamber and having a film sprocket hole engaging tooth or claw 29 which projects angularly inwardly through a suitable clearance aperture 30 in the wall 17 and an aligned clearance aperture 31 in the film gate 19 and is mounted to function oscillatably in known manner through an operating connection with the drive means within the housing chamber 21.

Operating in coordinated sequence with the shuttle 28 is a shutter 32 (FIGS. 2 and 3), desirably of the rectilinearly reciprocable type guided to move in a vertical path in the space between the lenses 24 of the optical system and the film exposure window aperture 18. In this instance, the shutter 32 comprises a plate-like member which is of sufficient width and length for effectively closing the aperture 18 in the closing position of the shutter and with a range of vertical movement wherein it clears below the aperture 18 in fully open position and maintains the aperture 18 fully closed during each film frame advance by the shuttle 28, with which the reciprocable movements of the shutter are coordinated.

In the form shown, the shutter 32 is carried by an angular rearwardly turned flange 33 properly located along one side of a vertically elongated guide plate 34 having identical upwardly and downwardly projecting aligned guide arms 35 each of which has a vertical slot 37 within which is engaged a respective guide stud 38 fixedly mounted on the frame structure within the camera. For timed rectilinear reciprocation of the shutter, the shuttle plate 34 has intermediate its length a horizontal slot 39 into which extends a crank stud 40 of an eccentric 41 fixed upon an eccentric pin projecting rigidly forwardly from a crank arm 43 on a drive shaft 44 which is suitably driven by the motor means within the chamber 21 of the camera. Through this arrangement, the shutter is driven through one cycle for each frame of film advance.

Exposure time of the image focused on the film 20 by the lens system is, of course, controlled by the time the shutter is in its open position during its reciprocal cycle. Since the shutter 32 is located as close as practicable to the film and thus the focal plane of the lens system, the exposure cycle is controlled so that the ground light, or top portion, of the apertured film frame is exposed longer than the sky light, or bottom portion, of the apertured film frame by proper coordination of operation of the shuttle 28 with the cycle of operation of the shutter. Hence, during each exposure interval the top portion of the apertured frame is exposed first with the shutter moving down until the full aperture is exposed and then rising toward the top of the aperture to close it. The over- brightness of the sky light is thus de-emphasized and a more pleasing exposure combination for the average scene attained. Moreover, when the camera is stopped, the arrangement is such that the shutter 32 entirely covers or closes the aperture 18 to prevent fogging of the film frame that remains in position at the aperture.

According to the present invention, means are provided for automatically controlling the diaphragm means 25, to afford correct light opening size for prevailing light conditions related to film speed and exposure time, by utilizing light of the image beam through the lens system in the intervals when the film aperature is closed by the shutter. For attaining this automatic exposure control, the light-reflecting means are provided desirably in the form of a light reflecting surface 45 carried by the shutter 32 on its lens-opposing side and properly angled to reflect the light beam from the lens into a light-sensitive photoconductive cell 47 connected as by electrical leads 48 to a light measuring device such as a meter 49 carried by the bracket 27 and mounted to operate the diaphragm or iris means or plates 25 for automatically controlling the stop aperture or opening defined thereby.

In a convenient arrangement, the reflecting surface 45 comprises a mirror face suitably provided on a supporting body or member 50 which may be a block of a suitable solid plastic material. Desirably, the reflecting surface 45 may be an aluminized highly polished surface of the block. Through this arrangement, effective automatic exposure control is attained because in the rapid cyclical reciprocations of the shutter 32 there is sufficient repetitive continuity of light beam reflection into the electric eye cell 47 for the practical purposes of the camera.

Further, since the shutter 32 closes the film aperture during the non-running condition of the camera, the light beam impinged on the light cell 47 causes the automatic exposure control system to maintain the proper light aperture in the diaphragm means 25 in readiness for resumption of filming.

Since the light-sensitive cell 47 is responsive to the maximum illumination afforded by any part of the reflected image, there is a tendency for the cell to be overly influenced by the sky light which is of greater intensity as contrasted to the ground light of the image, resulting, unless compensated or balanced out, in underexposure of the ground or darker portions of the image. Herein a substantially balanced relationship is attained by de-emphasizing the sky light transmitted to the cell 47 by such an arrangement of the reflecting surface 45 that it automatically transmits to the cell a proper ground-sky light balance to attain the desired results. This is efficiently accomplished by having the reflecting surface 45 so oriented relative to the shutter 32 that while substantially all or full value of the ground light is reflected in each cycle of the shutter, the sky light is substantially cut out or at least diminished during at least a substantial portion of the cycle.

To this end, as best seen in FIG. 3, the mirror surface 45 is substantially shorter than the shutter 32 and is mounted with respect to the upper portion of the shutter so that on the lower portion of the shutter there is no reflecting surface. Hence, in the uppermost, film aperture closing position of the shutter, substantially full value of the reflected light forming the ground portions of the image is reflected to the photoelectric cell 47, and only sufficient sky light from the image beam is reflected to maintain a substantial balance in the sensitizing light reaching the photo cell. To this end, stated another way, the mirror surface 45 is so dimensioned that in the top-of-the-stroke, closing position of the shutter 32, substantially all of the light beam image above the optical center line comprising the ground light area of the image is reflected toward the cell 47, while only a fractional adjacent portion of the beam image below the optical center line is reflected toward the light cell. This is schematically visualized in FIGURE 3 where the outline of the film aperture 18a generally represents the area covered by the light beam image and wherein it will be understood the ground light area is generally located in the upper half portion, that is above the optical center line, while the sky light area of the image is that portion below the optical center line.

Excellent results are attained where the central portion of the lower end of the mirror surface 45 projects only a short distance below the optical center line into the sky light area of the optical image, as shown at 51, with a tapering off of the mirror surface from the center in each direction upwardly and toward the sides of the mirror to gradually cut back the median zone portions of the ground light area contiguous the adjacent side portions of the sky light area. This results in a satisfactory average light balance which has been arrived at by plotting light value curves in an experimental series of progressive maskings of different proportions of the area of a mirror which covered the full length of the shutter.

Through the disclosed mirror configuration, the dual functions of balancing the light reflected to the photo cell 47 while the camera is running, and of balancing the light reflected to the photo cell when the camera is stopped, are accomplished with the same means, namely, by the single shutter-carried mirror surface 45.

While the carrying-back or block 50 has been shown in the desirable, lightweight configuration as matching the configuration of the mirror surface 45 including its central downward projection 51, desirable results can also be obtained by having the mirror-carrying surface of the block coextensive with the shutter 32, as for example, in FIGURE 5 wherein the shutter 32' carried by the reciprocable shutter plate 34' has mounted thereon the reflector block 50' having on the upper lens-opposing surface thereof the ground light reflecting surface portion 45'. The lower end portion of the reflecting surface face of the block 50' is rendered completely non-reflective as by masking the same with black paint 52, or the like. In that portion of the reflecting surface face of the block 50' which, in the non-running or at rest, aperture 18a' closing position of the shutter receives the sky light portion of the beam to be reflected a partial masking or obscuring, as shown at 53, of the reflecting surface is effected in any suitable manner as by means of an applied piece of density filter, sprayed paint spots, light diffusing applied particles, etched or sand blasted light diffusion treatment, and the like, sufficient to de-emphasize the sky light for proper average light balance.

In FIGURE 6 another modified arrangement is disclosed wherein the shutter 32" carried by the reciprocable member 34" has the reflector block 50" provided with a reflecting surface 45" on its lens-opposing face which in the upper portion, namely, that area which in the stopped position of the shutter reflects ground light to the photo cell, is mirror-reflective. In the lower portion of the face it is suitably masked as depicted at 54 from a high density in the lower portion to a progressively lighter density and thus more reflective condition to approximately the median zone between ground light and sky light of the reflected image, reference being had to the aperture outline 18a".

Suitable means are provided for adjusting for film speed rating, herein comprising a masking device 55 (FIGS. 2 and 4) interposed between the mirror 45 and the light cell 47 across the reflected image path and preferably as closely as practicable to the reflected image plane at the light cell. To this end, an aperture 57 substantially equivalent to the film aperture 18 is provided in a plate 58 mounted across the front of the light cell 47 on a mounting bracket 59. The masking device 55 may comprise an elongated strip of translucent material slidably backed against the aperture plate 58 and having one longitudinal edge guidedly engaged in a suitable groove 60 in the mounting bracket 59.

Longitudinally thereof, the masking strip 55 is provided with progressively graduated density areas, one end portion of the strip being transparent as at 61, with progressively greater light absorbing areas being provided by light absorbing or opaque spots 62 in predetermined progressively increasing number longitudinally away from the entirely transparent area 61, up to a matt finish, substantially light absorbing but partially translucent major area 63 of the strip having a progressively diminishing density pattern of translucent spots 64 thereon from the end nearest the opaque spot area to the opposite end of the strip. It will be understood that the progressive density areas of the masking strip 55 are calibrated for a preferred range of film speed settings such as according to the ASA scale.

Although in the example shown, the mask strip 55 comprises a strip of film or other suitable transparent material which is substantially continuously variable in light transmission from clear to some small fraction of light transmission, it may be made of an entirely opaque material punched through with holes of appropriate sizes and distribution to accomplish the same purpose.

It should be noted, that the mask strip 55 is mounted vertically and the light reflected thereto is in the same reference as to the film aperture 18a. That is, the top portion of the image area at the light cell aperture 57 receives reflected ground light and the lower portion of the image area at the aperture receives reflected sky light. Accordingly, the mask strip 55 is oriented so that the less dense and in this instance the transparent area 61 is at the top and the progressively denser areas are downward.

As distinguished from the conventional uniform density film speed setting masking devices, which have monodensity film setting areas, the mask strip 55 is progressively of variable density from top to bottom, and therefore attenuates the reflected light to the photo cell 47, at any given setting, variably from top to bottom. Orientation of any film speed area of the mask in registration with the aperture 57 with the less dense portion thereof at the top portion of the aperture and with the denser portion at the lower portion of the aperture 57 substantially balances the ground-sky light relationship or ratio, properly coordinated with the reflecting surface 45.

If preferred, the masking strip 55 itself because it is equipped with light-balancing graduated density adjustably related frame areas may be relied upon to attain substantially balanced ground-sky light at the photo cell. For optimum results, with the rectilinearly reciprocable shutter 32, however, it is used in conjunction with the reflecting shutter mirror surface 45.

Vertical adjustment movement of the masking strip 55 is desirably effected by means accessible for manipulation exteriorly of the camera housing, such as a knob 65 on the outer end of a rotary shaft 67 carrying on its inner end a pinion gear 68 meshing with complementary rack teeth 69 on the adjacent longitudinal edge of the strip 55 which for this purpose projects sufficiently beyond the adjacent side of the aperture plate 57. Although at least one longitudinal edge of the strip is provided with the rack teeth 69, preferably both sides are so provided for standardization purposes and to facilitate assembly so that either edge may be alternately or selectively presented to the driving pinion 68. Through this arrangement, proper setting of the masking strip 55 can be quickly effected by turning the knob 65, with the adjustment being guided visually in a suitable manner, as by registering guide marks 70 (FIG. 1) on the knob with an index mark 71 adjacent thereto on the camera housing.

In FIGURES 7, 8 and 9 a modified embodiment of the invention is disclosed comprising a camera assembly 72 in which for transverse or side-to-side compactness of the camera a shuttle 73 and a shutter plate 74 are mounted to operate in planes parallel to the optical axis. In this form of motion picture camera a film housing 75 provides a chamber 77 within which a cassette or film magazine is received and supports a strip of film 78 in position in a film gate member 79 having a framing aperture 80 in registration with an exposure aperture 81 in an aperture plate front wall portion 82 of the housing on which the film gate member is mounted.

Mounted with the lens axis centered with respect to the framing aperture 80 is a lens assembly 83 spaced forwardly from the aperture plate 82. In front of the aperture plate 82 a shutter 84 is vertically rectilinearly reciprocably supported by an intermediate portion of the elongated shutter plate 74. In a desirable construction, the shutter 84 comprises part of a one-piece block 85 of a suitable solid plastic material which is secured in any preferred manner to the adjacent face of the shutter plate 74.

Rectilinear vertical reciprocations of the shutter plate 74 to carry the shutter 84 in a cyclical path between aperture closing position and aperture opening position below the aperture are guided by respective fixed respective upper and lower guide pins 87 projecting from suitable framework 88 in the camera and extending into respective vertically elongated guide slots 89 in the shutter plate.

Cyclical vertical reciprocations of the shutter plate 74 are effected by means of an eccentric crank pin 90 operating in a horizontal slot 91 provided in the lower end portion of the shutter plate and projecting from one face of a gear member 92 meshing with a transmission gear member 93 mounted in the lower portion of the camera casing and having on one face thereof a gear portion 94 meshing with a driving pinion 95 on a drive shaft 97 of a small electrical motor 98 mounted on a longitudinal axis within the camera below the lens means 83 and driven by electrical energy derived from suitable batteries (not shown) mounted within the camera. Additional gearing 99 motivated through the shutter-driving gear 92 comprises a gear train for driving the customary film rewind spindle means.

Cycling of the flat, elongated plate shuttle 73 in coordinated sequence with the shutter 84 is effected by means including a driving crank pin 100 carried by the driven gear member 93 eccentric to its axis and journalled in the lower end portion of the elongated shuttle. This effects vertical reciprocations of the shuttle. Sequential front-to-rear movements of a film moving bill-like rearwardly projecting claw or prong 101 on the upper end of the shuttle in its frame-by-frame film shifting and return movements are guided during the longitudinal reciprocations of the shuttle by the guide edges defining a vertically elongated arcuate guide slot 102 formed intermediate the length of the shuttle, as shown, and engaging a fixed guide pin 103 on a bracket 104. Clearance for the prong 101 is afforded by aligned apertures 104 through the aperture plate 82 and the film gate member 79, and a clearance recess vertical groove 105 in the adjacent portion of the shutter block 85 avoids interference with the shuttle.

Illustrative of the coordinated sequence of shutter and shuttle operation, four relative positions of these members have been shown schematically in FIGURE 9. In the full line position of the shutter 84 it is in closing relation to the film aperture, and the full line position of the shuttle is that in which it is found in the non-running condition of the camera, namely, stopped in the act of pulling down or transporting the film to expose the next frame. The next position of the shutter 84a is shown in dash outline wherein it is moving downwardly to open the film aperture, and the shuttle 101a in corresponding dash outline has reached the bottom of its stroke and the prong head end of the shuttle is at the beginning of its inward film clearing movement of its stroking cycle. In the third or dot dash position, the shutter 84b has moved to fully lowered, aperture opening position, and the shuttle 101b is on its way up, as shown. The fourth, double dot dash position of the shutter 84c shows it in its upwardly moving aperture closing relationship while the shuttle head is moving the film engaging prong 101c outwardly into engagement with the film at the top of the shuttle stroke.

In the camera 72, similarly as in the camera 10, means are provided for effecting desirable sky-ground light balancing in the automatic exposure control system which includes a reflecting surface carried on an appropriately angularly disposed face 106 on the shutter block 85 facing toward the lenses 83 and in the aperture closing position of the shutter reflecting the image light beam into a photoelectric cell 107 suitably mounted on a bracket 108. For light balancing purposes, the lower sky light receiving portion of the face is omitted similarly as described in connection with the reflecting surface 45 in the camera 10, or the lower sky light reflecting portion of the reflecting surface 106 may be treated in the manner described in connection with FIGURES 5 or 6, for the purpose of de-emphasizing the sky light and directing to the photo cell 107 substantially full ground light, both in the running condition of the camera and in the non-running or stopped condition of the camera 72. A film speed setting device comprising an adjustable masking strip 109 is mounted in association with an aperture plate 110 having therein an aperture 111 in the image plane in front of the photo cell 107 and corresponding to the film aperture 80, similarly as described in connection with the camera 10.

In some cameras, such as those utilizing a rotary shutter 112 (FIG. 10) having a reflecting surface 113 for directing the light beam from the lens to an automatic iris opening control system electric eye 114 when a film aperture 115 in a film plate 117 is closed, de-emphasizing or compensation for sky light may only be desired in the stopped condition of the camera to balance the light reflected to the photo cell with that reflected to it in the running condition of the camera. For this purpose, a separate sky light de-emphasizing mask member 118 may be suitably disposed within the camera to move into sky light masking position in the stopped condition of the camera but to be withdrawn from masking position when the camera is running. For example, the masking member 118 may be mounted on a pivoted lever 119 and normally urged by biasing means such as a spring 120 into position between the electric eye 114 and the aperture 115 to intercept a substantial portion of the sky light of the reflected image beam. Means such as a linkage 121 between the lever 119 and a starting member such as a lever 122 of the camera may be provided to withdraw the light-balancing mask 118 when the camera is started.

Instead of operating directly in front of the photo cell 114, it may be more convenient to have the light-balancing mask 118 disposed to intercept the sky light portion of the image beam of the lens system either in front of or back of the iris of the camera. Whatever the specific location of the balancing mask 118 its function will be the same.

It will be understood that modifications and variations may be effected without departing from the scope of the novel concepts of the present invention.

I claim as my invention:

1. In a camera including lens means for directing an image light beam onto a photographic film behind an aperture intermittently opened and closed by a shutter, behind the lens automatic exposure control means including light-sensitive photoconductive cell means, and means for directing the ground light portions of the image beam at substantially full value to the photoconductive cell but de-emphasizing the sky light portions of the light beam, whereby to attain substantial ground-sky light balance in the operation of the automatic exposure control means.

2. A camera as defined in claim 1, wherein the means for directing the ground light portions of the beam to the photoconductive cell and de-emphasizing the sky light portions of the beam comprises ground light and sky light reflecting areas which in the fully aperture-closing position of the shutter attain the optimum sky-ground light balance.

3. A camera as defined in claim 2, wherein the reflecting areas comprise a major area disposed in the closed position of the shutter in the ground light area of the light beam image, and a substantially smaller area disposed in the sky light area of the light beam image in said closed position of the shutter.

4. A camera as defined in claim 2, wherein said reflecting areas include a sky light portion masked to reduce the reflecting value thereof.

5. A camera as defined in claim 1, wherein said means for directing the ground light portions of the beam at substantially full value and for de-emphasizing the sky light portions of the beam comprises means for masking a substantial portion of the sky light.

6. A camera as defined in claim 5, wherein said masking means is carried by the shutter.

7. A camera as defined in claim 5, wherein said masking means comprises a combination film speed setting and sky light masking member.

8. A camera as defined in claim 5, wherein said masking means comprises a member which is mounted for movement into and out of the light beam and includes means for moving it out of the light beam when the shutter is open and for moving it into the light beam when the shutter is closed.

9. In a motion picture camera including a lens system for directing an image light beam onto motion picture film behind a film aperture,
a reciprocable shutter associated with said aperture,
film moving means adjacent to said aperture,
means for driving the shutter and film moving means in coordinated relation,
automatic exposure control diaphragm means including a light-sensitive photoconductive cell located inside the camera,
and means carried by the shutter operative in the aperture-closing position of the shutter to direct the ground light portion of the image light beam from the lens system at substantially full value to the photoconductive cell but de-emphasizing the sky light portion of the light beam.

10. In a motion picture camera including a lens system for directing an image light beam onto motion picture film behind a film aperture,
a reciprocable shutter associated with said aperture,
film moving means adjacent to said aperture,
means for driving the shutter and film moving means in coordinated relation,
automatic exposure control diaphragm means including a light-sensitive photoconductive cell located inside the camera,
and means carried by the shutter affording a reflecting surface facing toward the lens system and interceptive of the image light beam therefrom and including a reflecting surface disposed to reflect the ground light portions of the light beam at substantially full value to the photoconductive cell in the closed aperture position of the shutter but having only a small reflecting area in the sky light portion of the beam adjacent to the ground light portion in said closed position of the shutter,
whereby the sky light is de-emphasized and a ground-sky light balance is attained in the automatic exposure control means.

11. In a camera including lens means for directing an image light beam onto a photographic film behind an aperture intermittently opened and closed by a shutter,
behind the lens automatic exposure control means including a light-sensitive photoelectric cell,
means for directing the ground light portions of the beam at substantially full value into said cell but de-emphasizing the sky light portions of the light beam so directed,
and combination film speed setting and ground-sky light balancing masking means mounted adjustably between the cell and said directing means.

12. In a camera including lens means for directing an image light beam onto a photographic film behind an aperture intermittently opened and closed by a shutter,
behind the lens automatic exposure control means including a light-sensitive photoelectric cell,
means for directing the ground light portions of the beam at substantially full value into said cell but de-emphasizing the sky light portions of the light beam so directed,
and a film speed setting masking strip and means for adjustably longitudinally positioning selected longitudinal portions of the strip in light beam intercepting position between said cell and said directing means, said mask strip being of progressively varying density from end-to-end,
film setting areas of said masking strip being of greater density in the sky light intercepting portions than in the ground light intercepting portions whereby to cooperate with the directing means in de-emphasizing the sky light portions of the light beam.

13. In a motion picture camera including lens means for directing an image light beam onto photographic film moved by a shuttle frame-by-frame into position behind an aperture which is intermittently opened and closed by a reciprocating shutter in coordinated relation to the framing advances effected by the shuttle,
behind the lens automatic exposure control means including a light-sensitive photoconductive cell,
means for guiding said shutter in a reciprocating path from an open position below the aperture to a closing position whereby in the reciprocations of the shutter the ground portion of the beam image on the film is exposed longer than the sky portion of the image,
and means for directing the light beam to the photoconductive cell when the shutter is closed by operating to de-emphasize the sky light portions of the light beam directed to the photoconductive cell so as to coordinate operation of the automatic exposure control means with the shutter in attaining substantially uniform ground-sky light balance in the photographed images on the film frames.

References Cited by the Examiner

UNITED STATES PATENTS

| | | | |
|---|---|---|---|
| 888,802 | 5/08 | Hammer | 88—23 |
| 2,090,825 | 8/37 | Anthony et al. | 88—24 |
| 2,167,713 | 8/39 | Githens et al. | 352—207 X |
| 3,029,689 | 4/62 | Cech | 95—10 X |
| 3,057,251 | 10/62 | Mahn | 352—206 |
| 3,099,193 | 7/63 | Freudenschuss | 352—141 X |
| 3,105,428 | 10/63 | La Rue | 95—10 |
| 3,112,684 | 12/63 | Norwood | 95—64 |

FOREIGN PATENTS

| | | |
|---|---|---|
| 880,520 | 12/41 | France. |
| 1,184,474 | 2/59 | France. |
| 661,261 | 11/51 | Great Britain. |

NORTON ANSHER, *Primary Examiner.*

WILLIAM MISIEK, *Examiner.*